(12) United States Patent
Chiera et al.

(10) Patent No.: US 10,054,102 B2
(45) Date of Patent: Aug. 21, 2018

(54) QUIESCENT CHAMBER HOT GAS IGNITER

(71) Applicant: Woodward, Inc., Fort Collins, CO (US)

(72) Inventors: Domenico Chiera, Fort Collins, CO (US); Gregory James Hampson, Boulder, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 15/827,858

(22) Filed: Nov. 30, 2017

(65) Prior Publication Data
US 2018/0080429 A1    Mar. 22, 2018

Related U.S. Application Data

(63) Continuation of application No. 13/736,424, filed on Jan. 8, 2013, now Pat. No. 9,856,848.

(51) Int. Cl.
| | | |
|---|---|---|
| F02P 19/02 | (2006.01) | |
| F02B 9/10 | (2006.01) | |
| F02B 19/02 | (2006.01) | |
| F02B 19/10 | (2006.01) | |
| F02P 19/00 | (2006.01) | |

(52) U.S. Cl.
CPC .............. *F02P 19/02* (2013.01); *F02B 9/10* (2013.01); *F02B 19/02* (2013.01); *F02B 19/1095* (2013.01); *F02P 19/00* (2013.01); *Y02T 10/125* (2013.01)

(58) Field of Classification Search
CPC ...... F02B 9/06; F02B 9/08; F02B 9/10; F02B 19/02; F02B 19/1014; F02B 19/1095; F02P 19/00; F02P 19/02; F02P 19/04
USPC ......... 123/143 B, 145 A, 145 R, 146, 169 V, 123/209, 250–253, 255, 256, 258, 260, 123/266, 273, 286, 292, 293, 297; 313/143
See application file for complete search history.

(56) References Cited

U.S. PATENT DOCUMENTS

| | | |
|---|---|---|
| 892,296 A | 6/1908 | Oberhansli |
| 1,009,867 A | 11/1911 | Terry |
| 1,242,375 A | 10/1917 | Robinson |
| 1,253,570 A | 1/1918 | Berry |

(Continued)

FOREIGN PATENT DOCUMENTS

| | | |
|---|---|---|
| AT | 410007 | 1/2003 |
| AT | 509876 | 12/2011 |

(Continued)

OTHER PUBLICATIONS

Chiera et al., "Quiescent Chamber Hot Gas Igniter", U.S. Appl. No. 13/913,840, filed Jan. 8, 2013, 33 pages.

(Continued)

*Primary Examiner* — John Zaleskas
(74) *Attorney, Agent, or Firm* — Fish & Richardson P.C.

(57) ABSTRACT

An engine has an ignition source in a combustion chamber of the engine. An inner housing is provided that includes one or more jet apertures and defines an inner chamber containing the ignition source. An outer housing (or pre-chamber) is provided that includes one or more jet apertures in communication with the main combustion chamber and defines an outer chamber containing the inner housing.

7 Claims, 4 Drawing Sheets

(56) References Cited

U.S. PATENT DOCUMENTS

| | | | |
|---|---|---|---|
| 1,320,115 A | 10/1919 | Bloomhuff et al. | |
| 1,322,493 A | 11/1919 | Little | |
| 1,325,439 A | 12/1919 | Dinger | |
| 1,360,294 A | 11/1920 | Hill | |
| 1,361,347 A | 12/1920 | Nighswander | |
| 1,361,580 A | 12/1920 | Herz | |
| 1,538,750 A | 5/1925 | Scognamillo | |
| 1,594,773 A | 8/1926 | French | |
| 1,596,240 A | 8/1926 | Dikeman | |
| 1,611,856 A | 12/1926 | Farnsworth | |
| 1,700,603 A | 1/1929 | Vreeland et al. | |
| 1,732,827 A | 10/1929 | Adam | |
| 1,748,338 A | 2/1930 | Georgias | |
| 1,963,801 A | 6/1934 | O'Marra | |
| 2,047,575 A | 7/1936 | Burtnett | |
| 2,127,513 A | 8/1938 | Harper, Jr. | |
| 2,153,598 A | 4/1939 | Steward | |
| 2,208,030 A | 7/1940 | Holmes | |
| 2,231,173 A | 2/1941 | Starr | |
| 2,299,924 A | 10/1942 | Ost | |
| 2,314,128 A | 3/1943 | Coldwell | |
| 2,416,107 A | 2/1947 | Litton | |
| 2,456,080 A | 12/1948 | Wu Pe | |
| 2,487,535 A | 11/1949 | Fernandez | |
| 2,497,862 A | 2/1950 | Chuy | |
| 2,509,538 A | 5/1950 | Sues | |
| 2,586,864 A | 2/1952 | Rose | |
| 2,614,546 A | 10/1952 | Schwarz | |
| 2,673,554 A | 3/1954 | Thaheld | |
| 2,758,576 A | 8/1956 | Schlamann | |
| 2,776,394 A | 1/1957 | Cuny et al. | |
| 2,843,780 A | 7/1958 | Harper, Jr. | |
| 2,895,069 A | 7/1959 | Davis | |
| 2,899,585 A | 8/1959 | Dollenberg | |
| 2,957,099 A | 10/1960 | Dutterer | |
| 3,230,939 A | 1/1966 | Abramovich | |
| 3,270,722 A | 9/1966 | Springer | |
| 3,300,672 A | 1/1967 | Fisher | |
| 3,665,902 A | 5/1972 | Bloomfield | |
| 3,710,764 A | 1/1973 | Jozlin | |
| 3,718,425 A | 2/1973 | Weyl et al. | |
| 3,911,874 A | 10/1975 | Vincent | |
| 3,911,878 A | 10/1975 | Hofbauer et al. | |
| 3,958,144 A | 5/1976 | Franks | |
| 4,004,413 A | 1/1977 | Ueno | |
| 4,091,772 A | 5/1978 | Heater | |
| 4,092,558 A | 5/1978 | Yamada | |
| 4,096,832 A | 6/1978 | Casull | |
| 4,098,232 A | 7/1978 | Gleiter | |
| 4,123,998 A | 11/1978 | Heintzelman | |
| 4,124,000 A | 11/1978 | Genslak | |
| 4,125,094 A | 11/1978 | Noguchi et al. | |
| 4,143,627 A | 3/1979 | Noguchi | |
| 4,170,968 A | 10/1979 | Noguchi | |
| 4,218,993 A | 8/1980 | Blackburn | |
| 4,232,638 A | 11/1980 | Takahashi | |
| 4,242,990 A | 1/1981 | Scherenberg | |
| 4,248,189 A | 2/1981 | Barber et al. | |
| 4,248,192 A | 2/1981 | Lampard | |
| 4,372,264 A | 2/1983 | Trucco | |
| 4,398,513 A | 8/1983 | Tanasawa | |
| 4,406,260 A | 9/1983 | Burley | |
| 4,416,228 A | 11/1983 | Benedikt et al. | |
| 4,424,780 A | 1/1984 | Trucco | |
| 4,429,669 A | 2/1984 | Burley | |
| 4,441,469 A | 4/1984 | Wilke | |
| 4,452,189 A | 6/1984 | Latsch et al. | |
| 4,490,122 A | 12/1984 | Tromeur | |
| 4,509,476 A | 4/1985 | Breuser et al. | |
| 4,532,899 A | 8/1985 | Lorts | |
| 4,612,888 A | 9/1986 | Ishida | |
| 4,641,616 A * | 2/1987 | Lampard | F02B 19/02 123/256 |
| 4,646,695 A * | 3/1987 | Blackburn | F02B 19/12 123/256 |
| 4,744,341 A * | 5/1988 | Hareyama | F02B 19/14 123/256 |
| 4,765,293 A | 8/1988 | Gonzalez | |
| 4,795,937 A | 1/1989 | Wagner et al. | |
| 4,854,281 A | 8/1989 | Hareyama et al. | |
| 4,901,688 A | 2/1990 | Kashiwara et al. | |
| 4,930,473 A | 6/1990 | Dietrich | |
| 4,963,784 A | 10/1990 | Niessner | |
| 4,987,868 A | 1/1991 | Richardson | |
| 5,014,656 A | 5/1991 | Leptich et al. | |
| 5,051,651 A | 9/1991 | Kashiwara et al. | |
| 5,067,458 A | 11/1991 | Bailey | |
| 5,076,229 A | 12/1991 | Stanley | |
| 5,085,189 A | 2/1992 | Huang | |
| 5,091,672 A | 2/1992 | Below | |
| 5,105,780 A | 4/1992 | Richardson | |
| 5,107,168 A | 4/1992 | Friedrich et al. | |
| 5,222,993 A | 6/1993 | Crane | |
| 5,224,450 A | 7/1993 | Paul et al. | |
| 5,239,959 A | 8/1993 | Loth et al. | |
| 5,245,963 A | 9/1993 | Sabol et al. | |
| 5,271,365 A | 12/1993 | Oppenheim | |
| 5,369,328 A | 11/1994 | Gruber et al. | |
| 5,408,961 A | 4/1995 | Smith | |
| 5,421,300 A | 6/1995 | Durling et al. | |
| 5,430,346 A | 7/1995 | Johnson | |
| 5,454,356 A | 10/1995 | Kawamura | |
| 5,554,908 A | 9/1996 | Kuhnert et al. | |
| 5,555,862 A | 9/1996 | Tozzi | |
| 5,555,867 A | 9/1996 | Freen | |
| 5,555,868 A | 9/1996 | Neumann | |
| 5,560,326 A | 10/1996 | Merritt | |
| 5,612,586 A | 3/1997 | Benedikt et al. | |
| 5,619,959 A | 4/1997 | Tozzi | |
| 5,623,179 A | 4/1997 | Buhl | |
| 5,632,253 A | 5/1997 | Paul et al. | |
| 5,647,444 A | 7/1997 | Williams | |
| 5,662,181 A | 9/1997 | Williams et al. | |
| 5,678,517 A | 10/1997 | Chen et al. | |
| 5,715,788 A | 2/1998 | Tarr | |
| 5,791,374 A | 8/1998 | Black et al. | |
| 5,799,637 A | 9/1998 | Cifuni | |
| 5,803,026 A | 9/1998 | Merritt | |
| 5,821,675 A | 10/1998 | Suzuki | |
| 5,829,407 A | 11/1998 | Watson | |
| 5,892,319 A | 4/1999 | Rossi | |
| 5,947,076 A | 9/1999 | Srinivasan et al. | |
| 6,013,973 A | 1/2000 | Sato | |
| 6,060,822 A | 5/2000 | Krupa et al. | |
| 6,064,144 A | 5/2000 | Knoll et al. | |
| 6,095,111 A | 8/2000 | Ueda | |
| 6,129,069 A | 10/2000 | Uitenbroek | |
| 6,129,152 A | 10/2000 | Hosie et al. | |
| 6,130,498 A | 10/2000 | Shimizu et al. | |
| 6,198,209 B1 | 3/2001 | Baldwin et al. | |
| 6,279,550 B1 | 8/2001 | Bryant | |
| 6,302,067 B1 | 10/2001 | Merritt | |
| 6,305,346 B1 | 10/2001 | Ueda et al. | |
| 6,318,335 B2 | 11/2001 | Tomczyk | |
| 6,326,719 B1 | 12/2001 | Boehler et al. | |
| 6,340,013 B1 | 1/2002 | Britton | |
| 6,460,506 B1 | 10/2002 | Nevinger | |
| 6,463,890 B1 | 10/2002 | Chomiak | |
| 6,495,948 B1 | 12/2002 | Garrett, III | |
| 6,554,016 B2 | 4/2003 | Kinder | |
| 6,574,961 B2 | 6/2003 | Shiraishi | |
| 6,595,182 B2 | 7/2003 | Oprea | |
| 6,611,083 B2 | 8/2003 | LaBarge et al. | |
| 6,670,740 B2 | 12/2003 | Landon, Jr. | |
| 6,749,172 B2 | 6/2004 | Kinder | |
| 6,830,017 B2 | 12/2004 | Wolf et al. | |
| 6,913,092 B2 | 7/2005 | Bourgoyne et al. | |
| 7,004,444 B2 | 2/2006 | Kinder | |
| 7,007,661 B2 | 3/2006 | Warlick | |
| 7,007,913 B2 | 3/2006 | Kinder | |
| 7,025,036 B2 | 4/2006 | Lampard | |
| 7,086,376 B2 | 8/2006 | McKay | |
| 7,100,567 B1 | 9/2006 | Bailey et al. | |
| 7,104,245 B2 | 9/2006 | Robinet et al. | |

(56) References Cited

U.S. PATENT DOCUMENTS

| | | |
|---|---|---|
| 7,367,307 B2 | 5/2008 | Lampard |
| 7,370,626 B2 | 5/2008 | Schubert |
| 7,408,293 B2 | 8/2008 | Francesconi et al. |
| 7,409,933 B2 | 8/2008 | Nino |
| 7,438,043 B2 | 10/2008 | Shiraishi |
| 7,615,914 B2 | 11/2009 | Francesconi et al. |
| 7,628,130 B2 | 12/2009 | Johng |
| 7,659,655 B2 | 2/2010 | Tozzi et al. |
| 7,743,753 B2 | 6/2010 | Fiveland |
| 7,762,320 B2 | 7/2010 | Williams |
| 7,848,871 B2 | 12/2010 | Onishi |
| 7,856,956 B2 | 12/2010 | Inoue et al. |
| 7,891,426 B2 | 2/2011 | Williams |
| 7,922,551 B2 | 4/2011 | Tozzi |
| 7,950,364 B2 | 5/2011 | Nerheim |
| 8,033,335 B2 | 10/2011 | Orbell et al. |
| 8,143,772 B2 | 3/2012 | Francesconi |
| 8,181,617 B2 | 5/2012 | Kuhnert et al. |
| 8,261,711 B2 | 9/2012 | Shimoda |
| 8,286,734 B2 | 10/2012 | Hannegan et al. |
| 8,313,324 B2 | 11/2012 | Bulat et al. |
| 8,322,432 B2 | 12/2012 | Bailey et al. |
| 8,353,337 B2 | 1/2013 | Bailey et al. |
| 8,387,587 B2 | 3/2013 | Ogata |
| 8,499,854 B2 | 8/2013 | Mitchell et al. |
| 8,733,331 B2 | 5/2014 | McAlister |
| 8,757,129 B1 | 6/2014 | Hill |
| 8,800,536 B2 | 8/2014 | Plata |
| 8,839,762 B1 | 9/2014 | Chiera et al. |
| 8,857,405 B2 | 10/2014 | Attard |
| 8,890,396 B2 | 11/2014 | Ernst |
| 8,924,136 B2 | 12/2014 | Nakamoto |
| 8,925,518 B1 | 1/2015 | Riley |
| 9,172,216 B2 | 10/2015 | Ernst |
| 2003/0196634 A1 | 10/2003 | Lausch |
| 2004/0061421 A1 | 4/2004 | Morita et al. |
| 2004/0100179 A1 | 5/2004 | Boley et al. |
| 2004/0123849 A1 | 7/2004 | Bryant |
| 2004/0177837 A1 | 9/2004 | Bryant |
| 2005/0000484 A1 | 1/2005 | Schultz et al. |
| 2005/0016495 A1* | 1/2005 | Lampard ............ F02B 19/02 123/261 |
| 2005/0092285 A1 | 5/2005 | Klonis et al. |
| 2005/0172929 A1 | 8/2005 | Strauss |
| 2005/0211217 A1 | 9/2005 | Boley et al. |
| 2005/0224606 A1 | 10/2005 | Dingle |
| 2005/0279321 A1 | 12/2005 | Crawford |
| 2006/0005803 A1 | 1/2006 | Robinet et al. |
| 2006/0278195 A1 | 12/2006 | Hotta |
| 2007/0069617 A1 | 3/2007 | Tozzi et al. |
| 2007/0151540 A1 | 7/2007 | Takahashi et al. |
| 2007/0169737 A1 | 7/2007 | Gong et al. |
| 2007/0236122 A1 | 10/2007 | Borror |
| 2007/0261672 A1 | 11/2007 | Lippert |
| 2008/0017165 A1 | 1/2008 | Schubert |
| 2008/0168963 A1 | 7/2008 | Gagliano |
| 2008/0257301 A1 | 10/2008 | Hotta |
| 2009/0236144 A1 | 9/2009 | Todd et al. |
| 2009/0241896 A1 | 10/2009 | Fiveland |
| 2009/0309475 A1 | 12/2009 | Tozzi |
| 2010/0132660 A1 | 6/2010 | Nerheim |
| 2010/0133977 A1 | 6/2010 | Kato |
| 2010/0147259 A1 | 6/2010 | Kuhnert et al. |
| 2010/0192909 A1 | 8/2010 | Ikeda |
| 2011/0036638 A1 | 2/2011 | Sokol et al. |
| 2011/0062850 A1 | 3/2011 | Tozzi |
| 2011/0065350 A1 | 3/2011 | Burke |
| 2011/0089803 A1 | 4/2011 | Francesconi |
| 2011/0148274 A1 | 6/2011 | Ernst |
| 2011/0297121 A1 | 12/2011 | Kraus et al. |
| 2011/0308489 A1 | 12/2011 | Herden |
| 2011/0320108 A1 | 12/2011 | Morinaga |
| 2012/0000664 A1 | 1/2012 | Nas et al. |
| 2012/0013133 A1 | 1/2012 | Rios, III et al. |
| 2012/0064465 A1 | 3/2012 | Borisov et al. |
| 2012/0103302 A1 | 5/2012 | Attard |
| 2012/0118262 A1 | 5/2012 | Johnson |
| 2012/0125279 A1 | 5/2012 | Hampson et al. |
| 2012/0125287 A1 | 5/2012 | Chiera et al. |
| 2012/0125636 A1 | 5/2012 | Linde et al. |
| 2012/0299459 A1 | 11/2012 | Sakakura |
| 2012/0310510 A1 | 12/2012 | Imamura |
| 2013/0000598 A1 | 1/2013 | Tokuoka |
| 2013/0042834 A9 | 2/2013 | Chiera et al. |
| 2013/0047954 A1 | 2/2013 | McAlister |
| 2013/0055986 A1 | 3/2013 | Tozzi et al. |
| 2013/0099653 A1 | 4/2013 | Ernst |
| 2013/0139784 A1 | 6/2013 | Pierz |
| 2013/0160734 A1 | 6/2013 | Redtenbacher et al. |
| 2013/0179050 A1 | 7/2013 | Munshi |
| 2013/0192896 A1 | 8/2013 | Bailey et al. |
| 2013/0206122 A1 | 8/2013 | Chiera et al. |
| 2013/0220269 A1 | 8/2013 | Woo et al. |
| 2014/0026846 A1 | 1/2014 | Johnson |
| 2014/0032081 A1 | 1/2014 | Willi et al. |
| 2014/0076274 A1 | 3/2014 | Tozzi et al. |
| 2014/0083391 A1 | 3/2014 | Gruber |
| 2014/0102404 A1 | 4/2014 | Sotiropoulou et al. |
| 2014/0137840 A1 | 5/2014 | McAlister |
| 2014/0144406 A1 | 5/2014 | Schock |
| 2014/0165980 A1 | 6/2014 | Chiera et al. |
| 2014/0190437 A1* | 7/2014 | Chiera ............ F02B 9/10 123/145 A |
| 2014/0209057 A1 | 7/2014 | Pouring |
| 2014/0261294 A1 | 9/2014 | Thomassin |
| 2015/0020769 A1 | 1/2015 | Huang |
| 2015/0040845 A1 | 2/2015 | Chiera et al. |
| 2015/0068489 A1 | 3/2015 | Bunce |
| 2015/0075506 A1 | 3/2015 | Ishida |
| 2015/0128898 A1 | 5/2015 | Osaka |
| 2015/0167576 A1 | 6/2015 | Glugla et al. |
| 2015/0260131 A1 | 9/2015 | Riley |
| 2015/0267631 A1 | 9/2015 | Miyamoto |
| 2015/0354481 A1 | 12/2015 | Geckler |
| 2016/0010538 A1 | 1/2016 | Suzuki |
| 2016/0017845 A1 | 1/2016 | Huang |
| 2016/0024994 A1 | 1/2016 | Engineer |
| 2016/0047323 A1 | 2/2016 | Suzuki |
| 2016/0053668 A1 | 2/2016 | Loetz |

FOREIGN PATENT DOCUMENTS

| | | |
|---|---|---|
| CA | 1010329 | 5/1977 |
| CA | 2320415 | 3/2001 |
| CN | 2825995 | 10/2006 |
| CN | 101076929 A | 11/2007 |
| DE | 31 20 007 | 12/1982 |
| DE | 3230793 | 2/1984 |
| DE | 3913665 | 10/1990 |
| DE | 4422939 | 1/1996 |
| DE | 19624965 | 1/1998 |
| DE | 10143209 | 6/2002 |
| DE | 101 44 976 | 4/2003 |
| DE | 102010004851 | 6/2011 |
| DE | 102011006597 A1 | 3/2012 |
| DE | 102012021842 B4 | 9/2014 |
| EP | 0216027 A1 | 4/1987 |
| EP | 0 675 272 | 10/1995 |
| EP | 0971107 | 1/2000 |
| EP | 1026800 A2 | 8/2000 |
| EP | 1028506 A1 | 8/2000 |
| EP | 0937196 | 9/2000 |
| EP | 1265329 | 12/2002 |
| EP | 1556592 | 10/2003 |
| EP | 1556932 | 7/2005 |
| EP | 1701419 | 9/2006 |
| FI | 121759 | 3/2011 |
| FI | 122501 | 2/2012 |
| FR | 577766 A | 9/1924 |
| FR | 764079 A | 5/1934 |
| FR | 985788 A | 7/1951 |
| FR | 2071129 A5 | 9/1971 |
| FR | 2131938 B2 | 8/1979 |
| FR | 2846042 | 4/2004 |

(56) References Cited

FOREIGN PATENT DOCUMENTS

| | | |
|---|---|---|
| GB | 588074 | 5/1947 |
| JP | 50077738 | 6/1975 |
| JP | S5252013 | 4/1977 |
| JP | 57-018283 | 1/1982 |
| JP | 58162719 | 9/1983 |
| JP | H02148588 | 12/1990 |
| JP | 03-011575 | 1/1992 |
| JP | 4133281 | 5/1992 |
| JP | 4262388 | 9/1992 |
| JP | 08-260970 | 10/1996 |
| JP | 09166024 | 6/1997 |
| JP | 2008-504649 | 2/2006 |
| JP | 2011-222205 A | 11/2011 |
| KR | 20140117152 A | 10/2014 |
| RU | 2116474 | 7/1998 |
| SU | 968493 | 10/1982 |
| SU | 1370269 | 1/1988 |
| WO | WO 1987/07777 | 12/1987 |
| WO | WO 1991/06142 | 5/1991 |
| WO | WO 1992/02718 | 2/1992 |
| WO | WO 2004/036013 | 4/2004 |
| WO | WO 2004/036709 | 4/2004 |
| WO | WO 2004/107518 | 12/2004 |
| WO | WO 2006/011950 | 2/2006 |
| WO | WO 2009/060119 A1 | 5/2009 |
| WO | WO 2009/109694 A2 | 9/2009 |
| WO | WO 2009/130376 A1 | 10/2009 |
| WO | WO 2010/072519 | 7/2010 |
| WO | WO 2011/031136 | 3/2011 |
| WO | WO 2011/085853 | 7/2011 |
| WO | WO 2011/101541 | 8/2011 |
| WO | WO 2011/128190 | 10/2011 |
| WO | WO 2011/151035 | 12/2011 |
| WO | WO 2012/21914 A1 | 2/2012 |
| WO | WO 2012/091739 | 7/2012 |
| WO | WO2014/201030 | 12/2014 |
| WO | WO2015/138987 A1 | 9/2015 |

OTHER PUBLICATIONS

Fino Scholl et al., "Development and Analysis of a Controlled Hot Surface Ignition System for Lean Burn Gas Engines" Proceedings of the ASME 2012 Internal Combustion Engine Division Spring Technical Conference ICES2012, May 6-9, 2012 (12 pages).
Sachin Joshi et al., "On Comparative Performance Testing of Prechamber and Open Chamber Laser Ignition" Journal of Engineering for Gas Turbines and Power, Dec. 2011, vol. 133, pp. 122801-1 to 122801-5.
McIntyre, Dustin L., et al., "Lean-Burn Stationary Natural Gas Reciprocating Engine Operation with a Prototype Miniature Diode Side Pumped Passively Q-Switched Laser Spark Plug" U.S. Department of Energy, National Energy Technology Laboratory, 2008, 14 pages.
Dale, J.D. et al., "Enhanced Ignition for I. C. Engines With Premixed Charge," Lawrence Berkeley Laboratory, Society of Automotive Engineers Annual Congress, Oct. 1980, 52 pages.
"New Spark Plug Concepts for Modern-Day Gasoline Engines," Beru Aktiengesellschaft, MTZ vol. 68, Feb. 2007, 8 pages.
BorgWarner BERU Systems Pre-Chamber Technology, 1 page.
BorgWarner BERU Systems, BERU Industrial Spark Plugs, Feb. 2012, 48 pages.
Maria-Emmanuella McCoole, M.Sc.E.E. et al.; Solutions for Improving Spark Plug Life in High Efficiency, High Power Density, Natural Gas Engines; Proceedings of ICES2006; ASME Internal Combustion Engine Division 2006 Spring Technical Conference; May 8-10, 2006, Aachen, Germany; ICES2006-1417; pp. 1-8.
Dr. Luigi Tozzi et al.; Advanced Combustion System Solutions for Increasing Thermal Efficiency in Natural Gas Engines While Meeting Future Demand for Low NOx Emissions; Proceedings of JRCICE2007; 2007 ASME/IEEE Joint Rail Conference & Internal Combustion Engine Spring Technical Conference; Mar. 13-16, 2006, Pueblo, Colorado USA; JRCICE2007-40026; pp. 1-7.
Jessica Adair et al; Knock Characterization Using Ionization Detection; GMRC Gas Machinery Conference; Oklahoma City, Oklahoma; Oct. 2006; pp. 1-23.
Hironori Osamura, Development of Long Life and High Ignitability iridium Spark Plug, Technical Paper, Seoul 2000 Fisita World Automotive Congress; Jun. 12-15, 2000 Seoul, Korea; 6 pages.
Hironori Osamura, Development of New Iridium Alloy for Spark Plug Electrodes; SAE Technical Paper Series; 1999-01-0796; SI Engine Components and Technology (SP-1437); International Congress and Exposition Mar. 1-4, 1999; 14 pages.
"Wartsila 34SG Engine Technology for Compressor Drive," Wartsila Engines, Wartsila Corporation 2009, 16 pages.
Chiera et al., "Controlled Spark Ignited Flame Kernel Flow", U.S. Appl. No. 14/045,625, filed Oct. 3, 2013, 60 pages.
Authorized Officer Laurent Fanuel, PCT International Search Report and Written Opinion of the International Searching Authority, PCT/US2013/071375, dated Mar. 13, 2014, 8 pages.
Authorized Officer Martinez Cebollada, PCT International Search Report and Written Opinion of the International Searching Authority, PCT/US2014/041758, dated Sep. 10, 2014, 11 pages.
Federal Mogul, Champion® Bridge Iridium Spark Plug, Industrial Gas Stationary Engines—High Demand/Premium Market, Jun. 2012, 1 page.
International Preliminary Report on Patentability, PCT/US2013/071375, dated Jul. 23, 2015, 6 pages.
Bosch, Spark Plugs Technical Information, published on or before Nov. 28, 2014, 28 pages.
Chiera et al., "Cap Shielded Ignition System", U.S. Appl. No. 14/664,431, filed Mar. 20, 2015, 22 pages.
The State Intellectual Property Office of the People's Republic of China, Notice on the First Office Action, Chinese Application No. 201380071788.9, dated Mar. 27, 2017, 14 pages.
Notice of Allowance issued in Chinese Application No. 201380071788.9 dated Jan. 30, 2018; 6 pages.

* cited by examiner

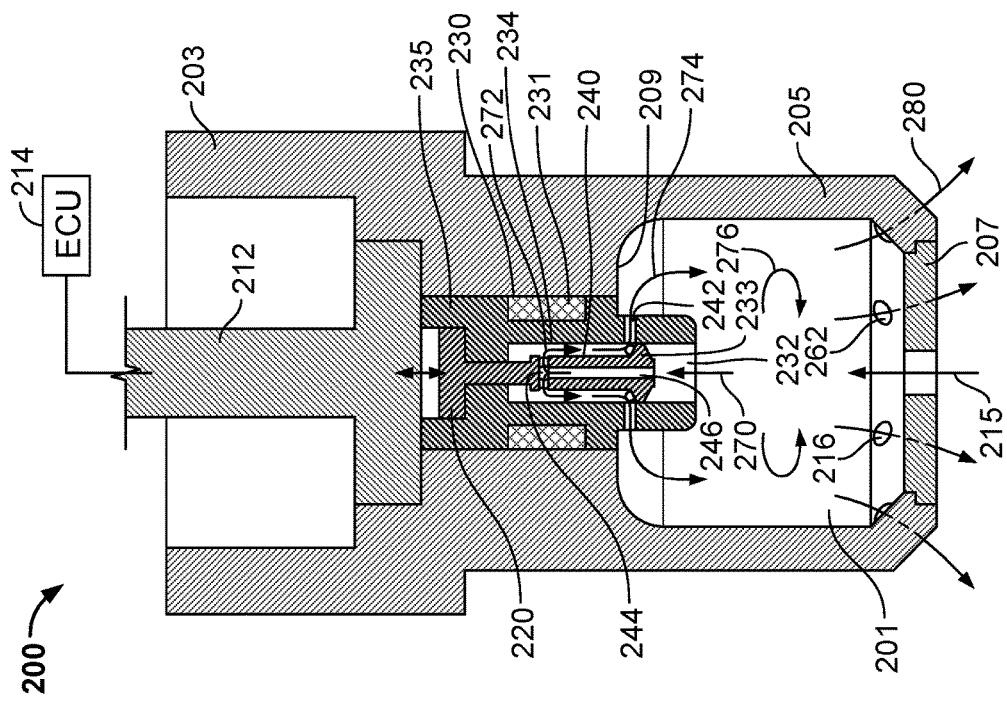
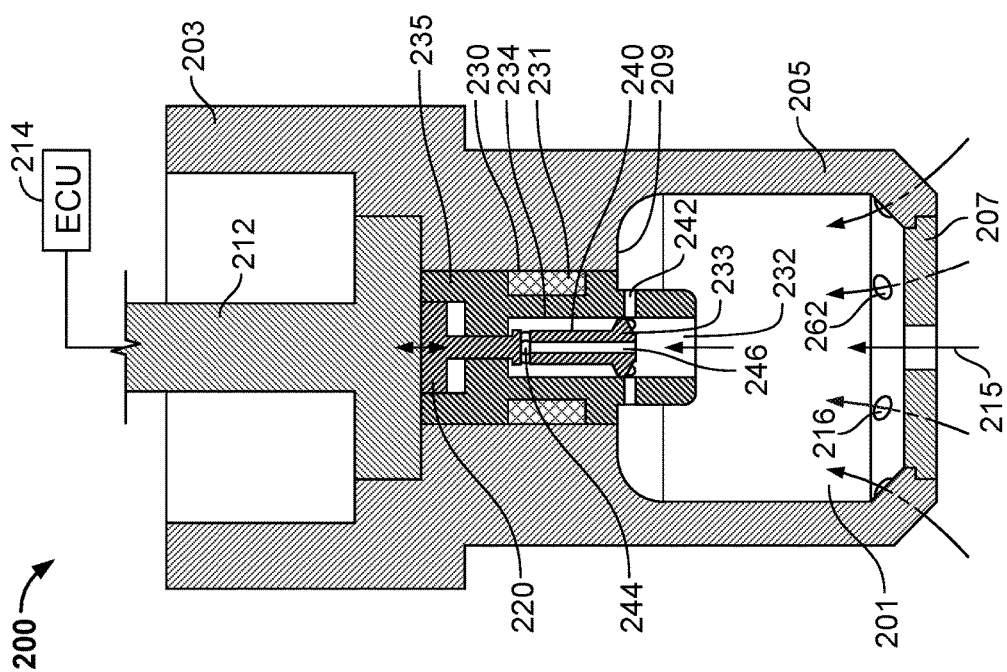
FIG. 2A
FIG. 2B

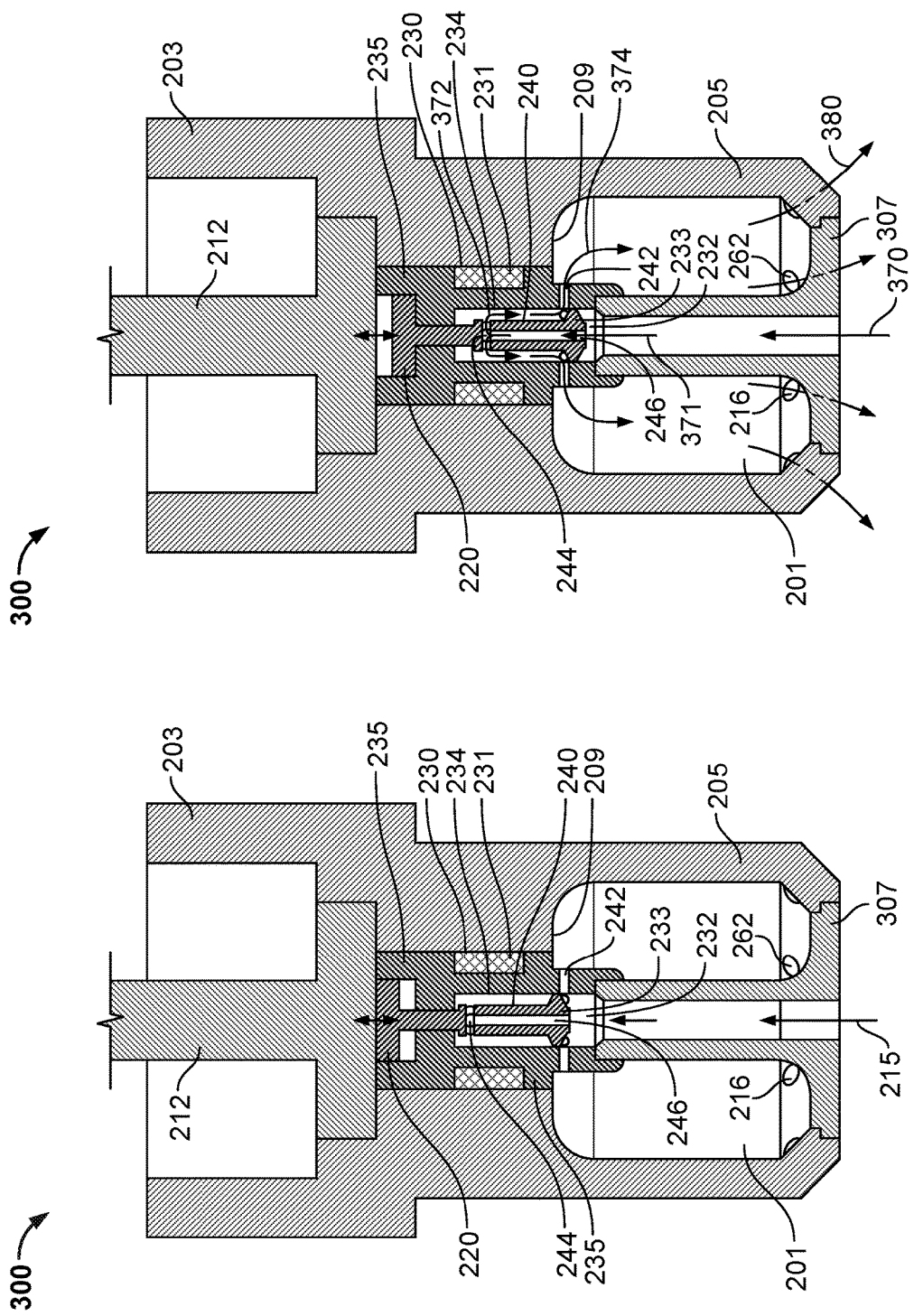

QUIESCENT CHAMBER HOT GAS IGNITER

CROSS-REFERENCE TO RELATED APPLICATIONS

The application is a continuation of and claims benefit of priority to U.S. patent application Ser. No. 13/736,424, filed on Jan. 8, 2013, the contents of which are hereby incorporated by reference.

BACKGROUND

In spark ignited internal combustion engines, the energy required to induce ignition is a function of the temperature, pressure and turbulence of the air-fuel mixture. For example, higher pressure requires a higher ignition voltage in a spark plug, eventually reaching a break-down limit (i.e., a break-down voltage, or BDV) This is a particular problem for highly boosted, high power density (or high BMEP) engines in general and especially for gas fueled power generation type engines. A hot surface igniter, i.e., an igniter that uses a hot surface (or point) to initiate combustion, does not suffer from BDV limitations. However, as compared to spark plugs, ignition timing (e.g., advancement or retardation of start of combustion) cannot be readily adjusted with hot surface igniters. For example, with a spark plug, ignition timing can be precisely controlled by applying a voltage to the spark plug when initiation of ignition is desired. In contrast, a hot surface igniter requires a relatively long time to raise and lower the surface temperature to above and below the combustion initiating temperature. Therefore, the hot igniter cannot quickly change temperature to change timing at which ignition is initiated.

SUMMARY

The present specification describes apparatus, methods, and systems for igniting a combustion mixture in an internal combustion engine using a quiescent chamber hot gas igniter. The disclosed igniter includes an ignition source with multiple chambers defined around the source. The innermost chamber tends to create a relatively quiescent zone around the ignition source to facilitate initiation of a flame kernel. Once the flame kernel is healthy, it increases pressure in the inner, quiescent chamber and, when allowed by a valve closure, forces a burning jet into a surrounding flame growth chamber. The surrounding, flame growth chamber is turbulent and the turbulence accelerates flame growth that, in turn, creates jets into the engine combustion chamber. These jets ignite the combustion mixture in the combustion chamber.

Because of the multiple chambers, the burn rate and turbulence within the inner chamber can provide conditions conducive to good ignition (e.g. low turbulence, quiescent) which can be independent of conditions in the surrounding chamber where high turbulence is beneficial for fast burn rate and healthy flame growth, and further independent of the burn rate and turbulence in the engine combustion chamber. In certain instances, the inner chamber can be configured to promote conditions that enable the kernel to be initiated with less energy than if there were substantial turbulence around the ignition source, such as an ignition source in a typical pre-chamber or in the main combustion chamber. Additionally, the outer chamber can be configured to promote conditions for flame growth. By opening and closing the valve closure, the timing of when the flame kernel is released into the flame growth chamber, and thus the ignition timing, can be controlled even with ignition sources that do not react quickly, such as a hot surface igniters.

An aspect encompasses an igniter plug for an internal combustion engine. The igniter plug includes a plug body adapted to couple to the internal combustion engine. An ignition source is carried on the plug body. An inner housing defines an inner chamber that contains the ignition source. The inner housing includes one or more jet apertures. An outer housing is provided around the inner housing, and defines a chamber containing the inner chamber. The outer housing also includes one or more jet apertures.

An aspect encompasses a method of igniting an air-fuel mixture in an internal combustion engine. In the method, combusting air-fuel mixture is sealed in an inner housing in a combustion chamber of the internal combustion engine. The combusting air-fuel mixture is released from the inner housing into an outer housing around the inner housing. An air-fuel mixture in the outer housing is ignited with the combusting air-fuel mixture from the inner housing. An air-fuel mixture in a combustion chamber around the outer housing is ignited with combusting air-fuel mixture from within the outer housing.

An aspect encompasses an engine having an ignition source in a combustion chamber of the engine. An inner housing is provided that includes one or more jet apertures and defines an inner chamber containing the ignition source. An outer housing is provided that includes one or more jet apertures and defines an outer chamber containing the inner housing.

The aspects above can include some, all or none of the following additional features.

In certain instances, the ignition source is hot surface igniter having a surface heated to a combustion initiating temperature. For example, the surface can be an interior facing surface of the inner housing and an electric heating element can be carried by the inner housing. In certain instances, the ignition source can be other types of ignition sources. For example, the ignition source can include a laser, an electrode for generating an electrical spark and/or other ignition sources.

In certain instances, the jet aperture of the inner housing extends between the inner chamber and the outer chamber and is adapted to jet burning air-fuel mixture from the inner chamber into the outer chamber. In certain instances, the plug body defines a back wall of the outer chamber and the jet aperture of the inner housing is adjacent to the back wall of the outer chamber.

The igniter plug can include a valve closure in the inner housing, moveable between sealing against and allowing flow through the jet aperture of the inner housing. The valve closure is responsive to a signal to move to allow combusting air-fuel mixture to flow from the inner chamber to the outer chamber. In certain instances, the inner chamber is substantially elongate and has an open axial end, and the jet aperture of the inner housing is oriented substantially laterally. In certain instances, the open axial end is at an exterior of the outer housing. In other instances, the open axial end can be in and in communication with the chamber defined by the outer housing. The valve closure includes an aperture extending therethrough. The inner chamber is sized to retain combusting air-fuel mixture in a portion of the inner chamber sealed from the jet aperture of the inner housing by the valve closure until the valve closure is moved to allow flow through the jet aperture of the inner housing. The inner chamber can also be sized to retain combusting air/fuel mixture from flowing out from the portion of the inner chamber through the aperture in the valve closure. The inner chamber is configured to maintain air-fuel mixture therein relatively more quiescent than air-fuel mixture in the outer chamber. The outer chamber can be provided without an ignition source, and rely on the burning air-fuel mixture for ignition.

The details of one or more embodiments are set forth in the accompanying drawings and the description below. Other features, objects, and advantages will be apparent from the description and drawings, and from the claims.

DESCRIPTION OF DRAWINGS

FIGS. 2A and 2B are detail cross sectional views of an example of the igniter plug that can be used in FIG. 1.

FIGS. 3A and 3B are detail cross sectional views of another example of the igniter plug that can be used in FIG. 1.

Like reference symbols in the various drawings indicate like elements.

DETAILED DESCRIPTION

Figure 1:
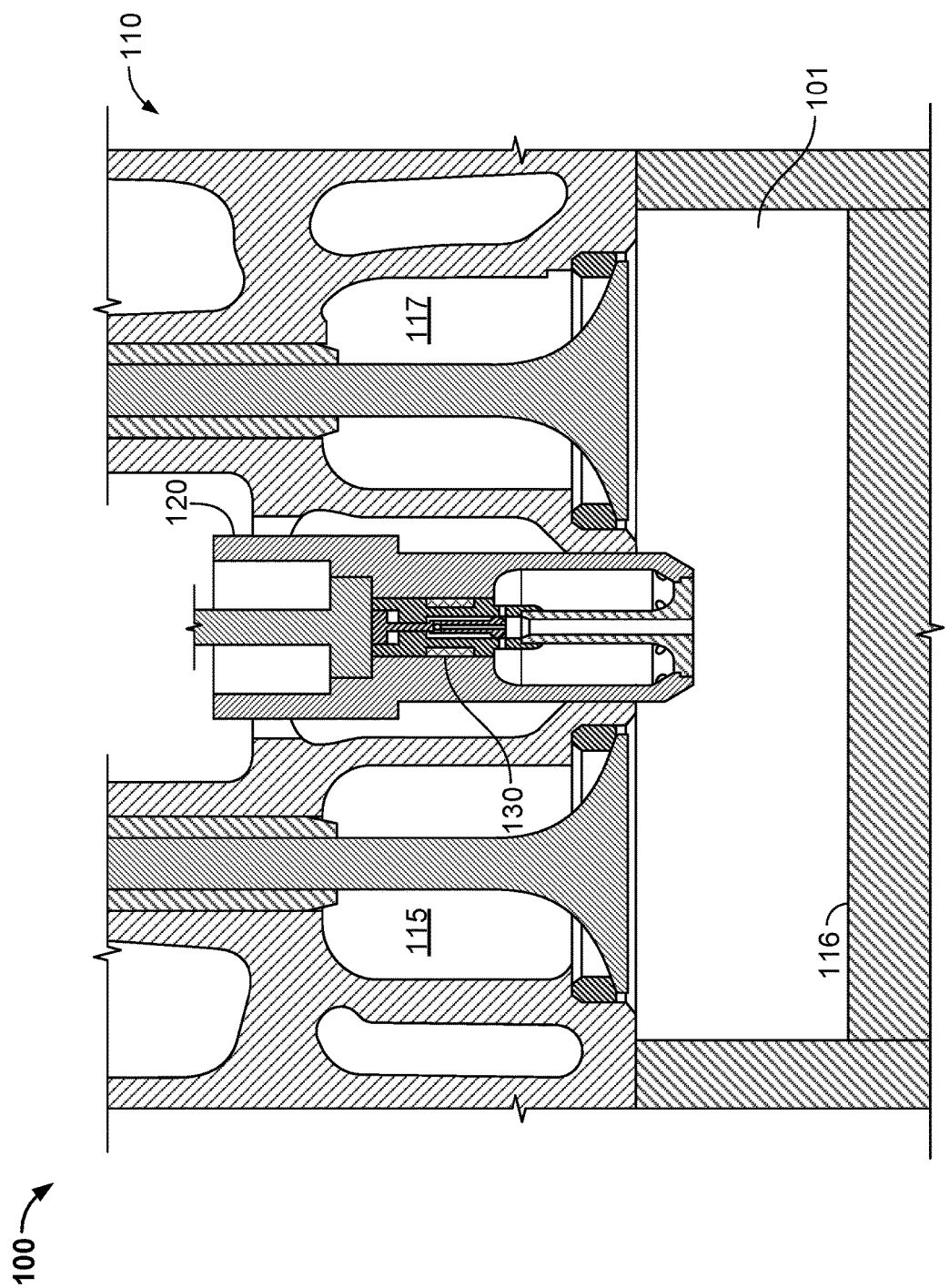
FIG. 1 is a cross sectional view of an example internal combustion engine with an igniter plug.

FIG. 1 is a cross sectional view of an example internal combustion engine 100 with an igniter plug 120. The example internal combustion engine 100 is illustrated in a detail view showing a single combustion chamber 101 and part of a piston 116. The example internal combustion engine 100 includes an intake port 115, the igniter plug 120, and an exhaust port 117. The intake port 115 allows air-fuel mixture to enter the combustion chamber 101, or in a direct injection engine, a fuel injector can be provided in the combustion chamber 101. The air-fuel mixture is compressed in the combustion chamber as the piston 116 moves upward, displacing the volume in the combustion chamber 101. Due to this rising pressure, the air-fuel mixture is pushed into the igniter plug via the orifice holes. The igniter plug 120 then ignites the compressed air-fuel mixture, increasing the temperature and then the pressure in the main chamber, driving the piston 116 downward, and powering the engine 100 to operate. The burnt gas exits the combustion chamber 101 through the exhaust port 117. The igniter plug 120 has an ignition source with multiple chambers around the ignition source. Although the igniter plug 120 is illustrated as being configured in a four-stroke gasoline internal combustion engine, the igniter plug 120 can be applied to other internal combustion engines that require an ignition source (e.g., as opposed to self-ignition). For example, the igniter plug 120 may also be used in other engine configurations such as a two stroke engine, a six-stroke engine, a Wankel engine, or other types of engines and may be used with any type of combustible fuel, including, gasoline, natural gas, biogas, diesel fuel, oil, and others.

FIGS. 2A and 2B are detail cross sectional views of an example of igniter plug 200 that can be used as the igniter plug 120 of FIG. 1. First turning to FIG. 2A, the igniter plug 200 includes a plug body 203 adapted to couple to an internal combustion engine, such as the example internal combustion engine 100 of FIG. 1. In certain instances, the plug body 203 is threaded into a corresponding threaded hole of the cylinder head of the engine. The plug body 203 carries an ignition or heating source 230. The ignition source 230 is contained in an inner housing, referred to as Q-chamber housing 235 ("Q" as in quiescent), that defines an inner chamber, referred to as Q-chamber 240. The Q-chamber housing 235 is further contained in an outer, pre-chamber housing 205, which defines an outer pre-chamber 201 containing the Q-chamber 240. As will be described in more detail below, air-fuel mixture in the Q-chamber 240 is relatively more quiescent than air-fuel mixture in the pre-chamber 201, which, in certain instances, is relatively more quiescent than air-fuel mixture in the combustion chamber (e.g., combustion chamber 101). Thus, the Q-chamber 240 incubates a flame that is later developed in the pre-chamber 201 and further expanded to ignite the mixture in the combustion chamber. Although the pre-chamber housing 205 and the plug body 203 are illustrated as a single integrated structure, in other implementations they can be separate structures assembled together.

The Q-chamber housing 235 includes a valve closure 220. The valve closure 220 can seal against the inner wall of the Q-chamber housing 235 (with sealing portion 233) and be actuated to move relative to the Q-chamber housing 235 between a closed position and an open position. FIG. 2A illustrates the valve closure 220 in the closed position and FIG. 2B illustrates the valve closure 220 in the open position. Although shown with a semi-conical head, the valve closure 220 can be other shapes. In certain instances, the head of the valve closure 220 is flat, flushed mounted or mounted at an angle similar to an intake or exhaust valve.

The FIGS. 2A and 2B show the Q-chamber 240 as being elongate and cylindrical, and the Q-chamber housing 235 having an open end 232 and one or more lateral apertures 242 (two visible in this cross-section). Both the opening 232 to the Q-chamber housing 235 and the lateral apertures 242 extend between the Q-chamber 240 and the pre-chamber 201. When the valve closure 220 is at the closed position, flow between the Q-chamber 240 and the pre-chamber 201 through the lateral apertures 242 is sealed by the close tolerance between the valve 233 and the valve body 235. A small gap may be present between 242 and 235, but it creates a narrow channel which will quench any combustion gases leaking past. The gap allows easy movement of the valve 233. To accommodate thermal expansion, the valve 233 can be made from a lower thermal expansion material than the body 235. When the valve closure 220 is at the open position, flow between the Q-chamber 240 and the pre-chamber 201 through the lateral apertures 242 is allowed. The opening 232 to the Q-chamber 240 can be straight or substantially aerodynamic in shape. The lateral apertures 242 are sized and/or otherwise configured to jet combusting air-fuel mixture in the Q-chamber 240 into the pre-chamber 201. Although the lateral apertures 242 are shown adjacent to a back wall 209 of the pre-chamber 201, the lateral apertures 242 can be provided at other locations in the Q-chamber housing 235. In certain instances, however, providing the lateral apertures 242 adjacent to the back wall 209 can help direct the flame growth downwards into the pre-chamber 201 when combusting air-fuel mixture jets from the Q-chamber 240 to the pre-chamber 201 through the lateral apertures 242, as further illustrated in FIG. 2B. The back wall 209 is defined by the plug body 203 and/or the pre-chamber housing 205, for example, the back wall is the ceiling of the pre-chamber 201.

The valve closure 220 can further include an axial passage 246 through the valve closure 220 aligned with the opening 232 to the Q-chamber housing 235. The axial passage 246 through the valve closure 220 communicates with the Q-chamber 240 through one or more lateral passages 244 through the valve closure 220 (two visible in this cross-section). This allows air-fuel mixture in the pre-chamber 201 to flow from the opening 232 of the Q-chamber housing 235 into the axial passage 246, and exit the lateral passages 244 into the Q-chamber 240. The air-fuel mixture can then be ignited in the Q-chamber 240 and further expand and jet into the pre-chamber 201 through the lateral apertures 242. Details of the ignition process are further discussed with reference to FIG. 2B.

The axial passage 246 through the valve closure 220 can extend past a sealing portion of the valve closure 220. For example, the sealing portion of the valve closure 220 can divide the Q-chamber 240 from the pre-chamber 201 by sealing against the Q-chamber housing 235 above the one or more lateral apertures 242 when the valve closure 220 is closed. When the valve closure 220 opens, the sealing portion is moved below the lateral apertures 242 and allows the lateral apertures 242 to connect the Q-chamber 240 with the pre-chamber 201. Furthermore, the Q-chamber can be sized to retain combusting air-fuel mixture above the sealing portion of the valve closure 220 when in a closed position, until the valve closure 220 is moved to allow flow through the lateral apertures 242.

The valve closure 220 can be actuated by an actuator 212. In the configuration illustrated in FIG. 2A, the actuator 212 is above the valve closure 220 and carried by the pre-chamber housing 205. The actuator 212 is responsive to a signal to move the valve closure 220 to allow combusting air-fuel mixture to flow from Q-chamber 240 to the pre-chamber 201. The actuator 212 can include a linear electromagnetic actuator to retract and extend the valve closure 220. In some implementations, the actuator 212 can also or alternatively include a cam-spring mechanism to move the valve closure up and down. Other manners of moving the valve closure 220 are possible.

In certain instances, the actuator 212 is controlled by an electronic control unit (ECU) 214. The ECU 214 can be the same ECU that controls other aspects of the engine operation (e.g., fuel injection, forced induction wastegate/bypass, load/speed governor, and other operations). The ECU 214 can signal the actuator 212 to actuate the valve closure 220 at as required by the engine operation based on a number of parameters. For example, the ECU 214 signals the actuator 212 to open the valve closure 220 at a specified time and for a specified duration in the engine cycle based on engine operating parameters such as engine speed, throttle position, output from a torque indicating sensor (e.g., MAP), air and/or fuel flow (e.g. MAF, lambda sensor, fuel injector duty cycle), knock sensor, and/or other engine operating parameters. The specified time can be different for different operating parameters, and based on igniting timing for combustion and/or to adjust igniting timing to prevent pre-ignition by opening and closing the valve. In instances where the igniter plug 200 uses a hot surface igniter, such as a heating block 231 to generate the hot surface at 234, the specified time can be more precisely controlled and more quickly changed by opening and closing the valve closure 220 than it can be controlled by cycling temperature changes of the ignition source.

In FIG. 2A, the valve closure 220 is shown at a closed position during a compression stroke. Air-fuel mixture is compressed and enters the pre-chamber 201 through a central jet aperture 207 and one or more jet apertures 262 distributed near the bottom perimeter of the pre-chamber housing 205, as indicated by the arrows 215 and 216. The compressed air-fuel mixture further enters through the opening 232, the axial passage 246 through the valve closure 220, and the lateral passages 244 through the valve closure 220 into the Q-chamber 240. In the Q-chamber 240, the air-fuel mixture can, initially, be ignited by the ignition source—here, a hot surface igniter having a surface 234 heated to a combustion initiating temperature in the Q-chamber housing 235. Thereafter, additional air-fuel mixture entering the Q-chamber 240 will be ignited, in part or entirely, by combusting air-fuel mixture already in the Q-chamber 240. The heated surface 234 is an interior facing surface of the Q-chamber 240. The surface 234 is heated using an electric heating element 231 carried by the Q-chamber housing 235. In some implementations, other ignition sources may be used instead of the hot surface 234, for example, laser, diesel/oil droplet, acoustic wave, shock wave, hot pin, an electrode, and/or other ignition sources.

The Q-chamber 240 is configured to continue to receive air-fuel mixture through the axial passage 246, despite the expanding, combusting air-fuel mixture therein. As flow enters the axial passage 246 at high velocity, it stagnates in the passage and causes a relatively higher pressure that tends to push the air-fuel mixture into the Q-chamber 240. The Q-chamber 240 is sized, however, so that the pressure in the Q-chamber 240 does not exceed the pressure in the axial passage 246 between cycles of the valve closure 220. Thus, the air-fuel mixture does not revert and flow out of the Q-chamber 240 through the axial passage 246.

The Q-chamber 240 is configured to cause the air-fuel mixture therein to be relatively more quiescent than the air-fuel mixture in the pre-chamber 201. For example, the Q-chamber 240 shelters the air-fuel mixture in the chamber 240 from the turbulence in the pre-chamber 201, causing the air-fuel mixture in the Q-chamber 240 to become quiescent (substantially or completely). Thus, the flame of the combusting air-fuel mixture therein is incubated in an environment that facilitates growth and strengthening of the flame, and then used to ignite the air-fuel mixture in the pre-chamber 201. In certain instances, the quiescent condition in the Q-chamber 240 can be configured to facilitate flame ignition and incubation using the hot surface 234. For example, because the air-fuel mixture is relatively quiescent, the hot surface 234 does not lose significant heat to surrounding materials of the Q-chamber housing 235. The flame kernel can be initiated under such relatively quiescent conditions with a very low level of energy, and less than is required with turbulent flow such as in the pre-chamber 201 or in the combustion chamber. Additionally, the pre-chamber 201 is configured to cause the air-fuel mixture therein to be relatively less quiescent than the air-fuel mixture in the pre-chamber 201 to promote flame growth.

As shown in FIG. 2B, the actuator 212 opens the valve closure 220 and enables the combusting gas to flow between the Q-chamber 240 and the pre-chamber 201. Thereafter, the incubated flame 272 expands from the Q-chamber 240 into the pre-chamber 201 forming a number of burning jets 274 through the lateral apertures 242 that ignite turbulent air-fuel mixture in the pre-chamber 201. The expansion process is illustrated using approximate arrows. As the flame 272 in the Q-chamber burns the remaining air-fuel mixture, flow from the axial passages 246 moves the combusting air-fuel mixture into the pre-chamber 201. The burning jets 274 sweep the air-fuel mixture off the back wall 209 and along the side wall of the pre-chamber 201, and reach deep into the rest of the space of the pre-chamber 201. Eventually, expansion of the flame in the pre-chamber 201 builds pressure and forms a number of burning jets 280 through the jet apertures 207, 262 of the pre-chamber housing 205 and into the combustion chamber. In the combustion chamber, the burning jets ignite the remainder of the air-fuel mixture.

FIGS. 3A and 3B are detail cross sectional views of another example igniter plug 300 that can be used as the igniter plug 120 of FIG. 1. The igniter plug 300 is structurally similar to the igniter plug 200, except for the bottom central jet tunnel 307, which extends to and is coupled with the bottom of the Q-chamber housing 235. This embodiment of the igniter plug 300 uses the central jet tunnel 307 to separate air-fuel mixture flowing to the Q-chamber 240 from the pre-chamber 201. The opening 232 of the Q-chamber housing 235 is coupled with the tubular portion of the central jet tunnel 307, that in turn, is in communication with the combustion chamber. The overall ignition process is illustrated using approximate arrows. First, incoming mixture 370 can enter the opening 232 by passing through the central jet tunnel 307. Because the central jet tunnel 307 extends through the pre-chamber 201, the incoming air-fuel mixture 370 can be shielded from turbulence in the pre-chamber 201. The incoming mixture 370 then feeds to the Q-chamber 240 and is ignited forming a Q-chamber ignition 372. As the Q-chamber ignition 372 burns the remaining air-fuel mixture, pressure in the chamber increases and forces a burning jet 374 through the lateral apertures 242 to ignite turbulent air-fuel mixture in the pre-chamber 201. The flame in the pre-chamber 201 then exits through the jet apertures 262 as ignition flame 380 to combust the air-fuel mixture in the engine combustion chamber.

Figure 4:
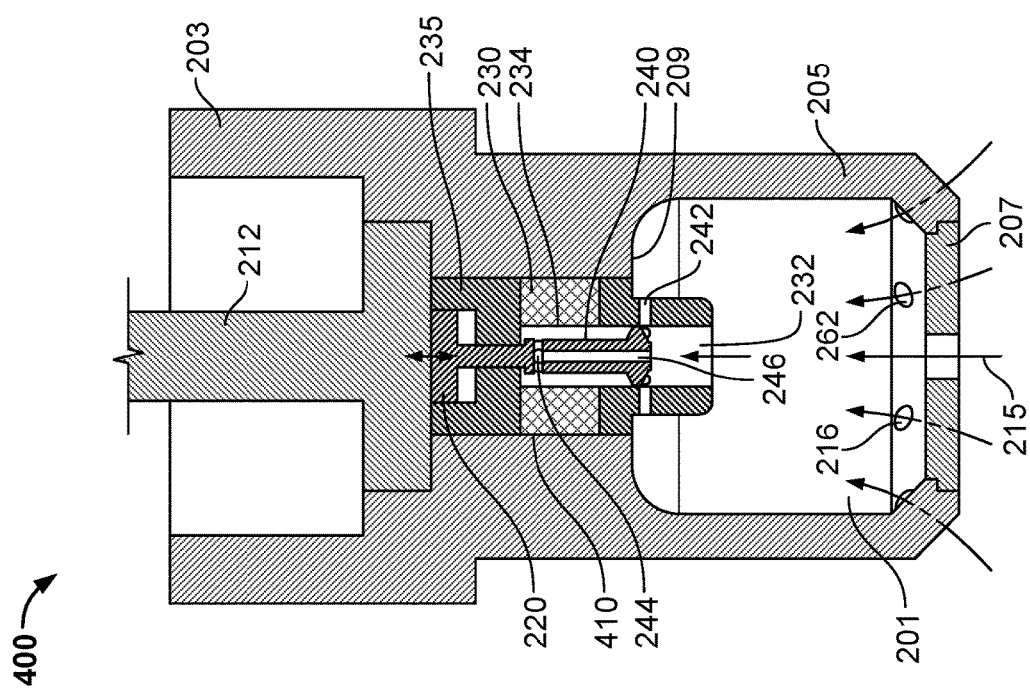
FIG. 4 is a detail cross sectional view of an example of the igniter plug using alternative heating sources.

FIG. 4 is a detail cross sectional view of an example of the igniter plug 400 using alternative ignition sources 410. The igniter may also apply to various types of internal combustion engines.

Notably, because of the multiple chambers, the burn rate and turbulence at ignition in the Q-chamber 240 can be independent of the burn rate and turbulence at flame growth in the pre-chamber 201, and further independent of the burn rate and turbulence in the engine combustion chamber. This independence allows designing for conditions in the Q-chamber 240 that facilitate flame initiation, and designing for conditions in the pre-chamber 201 that facilitate flame growth.

For example, high turbulence can be generated and present in the pre-chamber 201 at flame growth without negative effects on the flow field and flame kernel in the Q-chamber 240. The turbulence can be promoted by air-fuel mixture compressed into the pre-chamber 201 through the jet apertures during the piston compression stroke. The turbulence does not enter the Q-chamber 240 as the passages 246, 244 are sized to limit communication of the turbulence into the Q-chamber 240. At combustion, the turbulence in the pre-chamber 201 can promote the flame development after the flame is jetted out through the lateral apertures 242.

The Q-chamber 240 and the pre-chamber 201 can each maintain a different burn rate. For example, the air-fuel mixture can be incubated in the Q-chamber 240 at a lower burn rate than in the pre-chamber 201, which can have a much higher burn rate aided by turbulence. The pre-chamber 201 can be designed to have a specified degree of turbulence that provides for an increased or decreased burn rate, as desired. Therefore, the double chamber configuration can achieve precision (i.e., repeatability and consistency). In general, the higher the turbulence in the pre-chamber 201, the higher the burn rate. The higher burn rate can lead to a fast and high pressure rise and promote strong flame development, as well as high jet speed of flames into the engine combustion chamber for more efficient ignition of the main engine combustion. In addition, this can create fast velocity reacting jets exiting the pre-chamber 201 to provide larger surface area "fingers" with turbulence and overall fast combustion in the engine combustion chamber, thus extending the lean flammability limit of premixed charge engines. Further, when other conditions are the same, such double chamber igniter configuration can lead to improved fuel efficiency, lower emissions, and elimination of high voltage systems associated with single chamber or no chamber spark plugs.

During the start mode, the maximum amount of heating is required at element 231. However, as the engine heats up, residual gases will remain at the end of the previous combustion cycle and upon compression will self-heat. Due to the self-heating of the Hot Gases, the amount of externally supplied energy can be reduced. The degree of heating power will be adjusted by a' priori scheduling on speed and load or by a feedback controller (ECU).

The device can also be implemented into a control system which monitors combustion diagnostics such as start of combustion and centroid of heat release, rate of pressure rise, and max cylinder pressure and the like, and the adjusts the power and timing of the valve to reach these targets.

A number of implementations have been described above. Other implementations are within the scope of the following claims.

What is claimed is:

1. A method of igniting an air-fuel mixture in an internal combustion engine, the method comprising:
   feeding a first portion of air-fuel mixture from a main combustion chamber of the internal combustion engine into an inner housing of a pre-chamber chamber of the internal combustion engine through an aperture extending through a valve closure in the pre-chamber, the valve closure sealing a jet aperture between the inner housing and an outer housing of the pre-chamber;
   igniting the first portion of air-fuel mixture in the inner housing;
   retaining the ignited first portion of air-fuel mixture in the inner housing with the sealed jet aperture;
   moving the valve closure with respect to the jet aperture to open the jet aperture, the open jet aperture releasing the ignited first portion of air-fuel mixture from the inner housing into the outer housing;
   igniting a second portion of air-fuel mixture in the outer housing with the ignited first portion of air-fuel mixture from the inner housing; and
   igniting a third portion of air-fuel mixture in the main combustion chamber with the ignited second portion of air-fuel mixture from within the outer housing.

2. The method of claim 1, further comprising igniting the first portion of air-fuel mixture in the inner housing with heat from a heated surface in the inner housing.

3. The method of claim 2, where retaining the ignited first portion of air-fuel mixture in the inner housing further comprises maintaining the ignited first portion of air-fuel mixture in the inner housing in a relatively more quiescent state than air-fuel mixture outside of the inner housing.

4. The method of claim 1, where feeding the first portion of air-fuel mixture into the inner housing comprises feeding the first portion of air-fuel mixture into the inner housing from the outer housing through the aperture of the valve closure.

5. The method of claim 1, where the inner housing comprises an inner housing of an igniter plug; and
   where the outer housing comprises an outer housing of the igniter plug.

6. The method of claim 1, further comprising moving the valve closure to seal the jet aperture.

7. The method of claim 1 where feeding the first portion of air-fuel mixture into the inner housing comprises feeding the first portion of air-fuel mixture into the inner housing from the main combustion chamber through a central jet tunnel of the outer housing and the aperture of the valve closure.

\* \* \* \* \*

UNITED STATES PATENT AND TRADEMARK OFFICE
CERTIFICATE OF CORRECTION

Page 1 of 1

PATENT NO. : 10,054,102 B2
APPLICATION NO. : 15/827858
DATED : August 21, 2018
INVENTOR(S) : Domenico Chiera and Gregory James Hampson It is certified that error appears in the above-identified patent and that said Letters Patent is hereby corrected as shown below:

In the Specification

Column 1, Line 6, delete "The" and insert --This--.

Column 1, Line 6, after "claims" insert --the--.

Column 1, Line 8, delete "2013,the" and insert --2013, the--.

In the Claims

Column 8, Line 30, Claim 1, after "pre-chamber" delete "chamber".

Column 9, Line 1, Claim 7, delete "claim 1" and insert --claim 1,--.

Signed and Sealed this
Seventh Day of April, 2020

Andrei Iancu
*Director of the United States Patent and Trademark Office*